US010816081B2

(12) United States Patent
Kämmerer et al.

(10) Patent No.: US 10,816,081 B2
(45) Date of Patent: Oct. 27, 2020

(54) SPUR GEAR TRANSMISSION

(71) Applicant: Voith Patent GmbH, Heidenheim (DE)

(72) Inventors: Steffen Kämmerer, Immenstadt (DE);
Matthias Rauch, Kempten (DE);
Marco Schneider, Oberstaufen (DE)

(73) Assignee: Voith Patent GmbH, Heidenheim (DE)

(*) Notice: Subject to any disclaimer, the term of this patent is extended or adjusted under 35 U.S.C. 154(b) by 32 days.

(21) Appl. No.: 16/205,569

(22) Filed: Nov. 30, 2018

(65) Prior Publication Data
US 2019/0170238 A1 Jun. 6, 2019

Related U.S. Application Data

(63) Continuation of application No. PCT/EP2017/060775, filed on May 5, 2017.

(30) Foreign Application Priority Data

Jun. 1, 2016 (DE) .................. 10 2016 209 549

(51) Int. Cl.
*F16H 57/04* (2010.01)
*F16H 1/06* (2006.01)
(Continued)

(52) U.S. Cl.
CPC .......... *F16H 57/0409* (2013.01); *F16H 1/06* (2013.01); *F16H 57/027* (2013.01);
(Continued)

(58) Field of Classification Search
CPC ........ F16H 1/06; F16H 57/029; F16H 57/032; F16H 57/0495; F16H 57/027; F16H 57/0409
(Continued)

(56) References Cited

U.S. PATENT DOCUMENTS

| 2,214,485 A | 9/1940 | Short |
| 2,645,305 A | 7/1953 | Roos |

(Continued)

FOREIGN PATENT DOCUMENTS

| DE | 295 17 964 U1 | 2/1996 |
| DE | 198 60 353 C1 | 6/2000 |

(Continued)

OTHER PUBLICATIONS

Machine Translation of German Office Action for German Application No. 102016209549.8, dated Mar. 24, 2017. (Year: 2017).*

(Continued)

*Primary Examiner* — Vinh Luong
(74) *Attorney, Agent, or Firm* — Taylor IP, P.C.

(57) ABSTRACT

A spur gear transmission with at least two intermeshing spur gears the teeth of which are in meshing engagement with one another, and each of which are rotatable via an axis of rotation. The spur gear transmission has an enveloping wall which surrounds the two spur gears in circumferential direction and in the direction of the axes of rotation. The enveloping wall has an inner contour which is adapted to the outer diameter of the spur gears in such a manner that two annular gaps which merge into each other are formed between the enveloping wall and the spur gears. One annular gap respectively is arranged at least substantially concentrically with respect to a respective axis of rotation. The enveloping wall is formed by a two-part housing which is closed along a parting line and which has an upper part and a lower part.

16 Claims, 4 Drawing Sheets

(51) Int. Cl.
*F16H 57/027* (2012.01)
*F16H 57/029* (2012.01)
*F16H 57/032* (2012.01)
*F16H 57/02* (2012.01)

(52) U.S. Cl.
CPC ......... *F16H 57/029* (2013.01); *F16H 57/032* (2013.01); *F16H 57/0412* (2013.01); *F16H 57/0423* (2013.01); *F16H 57/0431* (2013.01); *F16H 57/0454* (2013.01); *F16H 57/0495* (2013.01); *F16H 2057/02078* (2013.01)

(58) Field of Classification Search
USPC ........................................................ 74/606 R
See application file for complete search history.

(56) References Cited

U.S. PATENT DOCUMENTS

| | | | | |
|---|---|---|---|---|
| 4,586,328 | A * | 5/1986 | Howald | F23R 3/10 60/732 |
| 5,403,019 | A * | 4/1995 | Marshall | F04D 29/122 277/413 |
| 5,950,501 | A | 9/1999 | Deeg et al. | |
| 6,334,369 | B1 * | 1/2002 | Sandig | F16H 1/08 74/413 |
| 10,502,309 | B2 * | 12/2019 | Kaemmerer | F16H 57/0427 |
| 2003/0006096 | A1 * | 1/2003 | Rimkus | F16H 57/027 184/6.12 |
| 2011/0277589 | A1 * | 11/2011 | Leibold | B22D 25/00 74/606 R |
| 2013/0025405 | A1 * | 1/2013 | Arisawa | F16H 57/0495 74/606 R |
| 2013/0233107 | A1 * | 9/2013 | Von Wilmowsky | F16H 57/02 74/421 R |
| 2014/0054114 | A1 | 2/2014 | Isomura et al. | |
| 2014/0260790 | A1 | 9/2014 | Passino et al. | |
| 2014/0311268 | A1 * | 10/2014 | Grosswald | F16H 57/0457 74/468 |
| 2015/0093235 | A1 * | 4/2015 | Stiehler | F01D 11/003 415/111 |
| 2015/0362024 | A1 | 12/2015 | Shimazaki et al. | |
| 2015/0377338 | A1 * | 12/2015 | Dietrich | B23K 20/127 74/606 R |
| 2017/0184193 | A1 | 6/2017 | Kaemmerer et al. | |
| 2018/0216723 | A1 * | 8/2018 | Barillot | F16H 57/0409 |
| 2018/0313443 | A1 * | 11/2018 | Kaemmerer | F16H 57/0436 |

FOREIGN PATENT DOCUMENTS

| | | | | |
|---|---|---|---|---|
| DE | 10 2006 022 964 A1 | 11/2007 | | |
| DE | 10 2007 041 318 A1 | 3/2009 | | |
| DE | 10 2010 024 590 A1 | 2/2011 | | |
| DE | 10 2011 012 660 A1 | 8/2012 | | |
| DE | 10 2012 214 082 B3 | 12/2013 | | |
| DE | 10 2014 115 517 A1 | 5/2016 | | |
| EP | 1 918 613 A2 | 5/2008 | | |
| EP | 2 535 618 A1 | 12/2012 | | |
| FR | 2 757 922 | 7/1998 | | |
| GB | 292 540 | 9/1928 | | |
| GB | 458 379 | 12/1936 | | |
| GB | 1 426 352 | 2/1976 | | |
| JP | S4834435 | 10/1973 | | |
| JP | 8-178031 | 7/1996 | | |
| JP | 2011-163365 A | 8/2011 | | |
| KR | 10-2010-0103090 | * | 9/2010 | ......... F16H 57/0409 |
| WO | 2012/028231 A1 | 3/2012 | | |
| WO | WO 2017072268 A1 | * | 5/2017 | ......... F16H 57/0409 |

OTHER PUBLICATIONS

Translation of Written Opinion of the International Searching Authority of PCT/EP2017/060775, dated Jul. 18, 2017 (Year: 2017).*
Notice of Transmission of the International Research Report and the Written Notice Issued the International Searching Authority or Declaration dated Jul. 18, 2017 for International Application No. PCT/EP2017/060775 (17 pages).
German Office Action dated Mar. 24, 2017 for German Application No. 10 2016 209 549.8 (14 pages).

* cited by examiner

SPUR GEAR TRANSMISSION

CROSS REFERENCE TO RELATED APPLICATIONS

This is a continuation of PCT application No. PCT/EP2017/060775, entitled "SPUR GEAR TRANSMISSION", filed May 5, 2017, which is incorporated herein by reference.

BACKGROUND OF THE INVENTION

1. Field of the Invention

The invention relates to a spur gear transmission, more particularly to a spur gear transmission having at least two intermeshing spur gears.

2. Description of the Related Art

Spur gear transmissions are known for example from WO 2012/028231 A1. Such spur gear transmissions are designed for example as high-speed transmissions such as turbo-transmissions.

In the case of such high-speed transmissions, such as turbo transmissions, the turbulence of the air-oil mixture in the interior space of the transmission housing causes undesirable losses. Various methods are known for the reduction of such losses. One method subjects the interior space of the transmission housing to evacuation by suction using a vacuum pump, whereby the pressure in the interior space of the transmission housing is lower than that of the environment outside the transmission housing.

Another method is presented in WO 2012/028231, referred to above, provides an enveloping wall, tightly fitting around the spur gears. The enveloping wall tightly surrounding the spur gears in a circumferential direction except for an inlet gap and optionally an outlet gap which is positioned outside the outside circumference of the spur gears. This encapsulation of the spur gears with the enveloping wall has also been provided to produce a negative pressure in the region of the outside diameter of the spur gears or in the region of the intermeshing thereof, which reduces the losses.

Both known methods are therefore based on the assumption that as low a pressure as possible, that is to say, as high a vacuum as possible, has to be produced in the region of the peripheral intermeshing of the spur gears in order to reduce the power losses. Therefore, accordingly elaborate measures for extensive sealing or respectively comparative powerful and thus expensive and energy intensive vacuum pumps were provided to optimize the vacuum as much as possible. These methods are associated with undesirable costs.

DE 198 60 353 C1 discloses a spur gear transmission, wherein the spur gears are enclosed by an additional interior housing that is mounted inside a main housing. A partial vacuum is generated in the interior space of the interior housing by a pump. The space between the interior housing and the main housing is under atmospheric pressure. The spur gears do not protrude outward from the interior housing, but are surrounded by the latter at a distance, and therefore merging annular gaps do not arise.

DE 10 2006 022 964 A1 describes a fluid equalizing container and a transmission equipped therewith. The fluid equalizing container surrounds the spur gears laterally over a section of their circumference.

DE 10 2007 041 318 A1 describes a manual transmission with a gear pump, wherein the gear pump is an external gear pump with two gear wheels which mesh with one another and of which one belongs to one of the sets of gears in the transmission. In order to form a pump gap, an additional housing is provided below the gear wheels, the housing extending partially over the circumference of the gear wheels.

GB 292 540 A describes gear wheels revolving at a high rotational speed in a housing, which gear wheels are assigned a special guide in order to improve the lubrication of the gear wheels. The guide partially surrounds the gear wheels and is enclosed on the underside at least in such a manner that the gear wheels do not protrude outside the guide.

GB 1 426 352 A describes a lubrication device for gear wheels in which a partially open interior housing is likewise provided, the interior housing closely surrounding the gear wheels on their lower side and on a lateral side.

GB 458 379 A discloses an air pump which is integrated into a transmission. The air pump has guide arcs which enclose the gear wheels on the end sides thereof.

US 2014/0054114 A1 discloses a lubricating oil supply for a transmission, in which a cover completely surrounds the pinion of two spur gears and surrounds the other gear wheel of the two spur gears over half of the circumference.

U.S. Pat. No. 5,950,501 A1 presents a spur gear transmission, the interior housing of which surrounds the spur gears at a certain distance and is evacuated or filled with a gas by a pump. Annular gaps merging into one another are not provided and the spur gears do not protrude outside the interior housing.

U.S. Pat. No. 2,645,305A describes a lubricating device for spur gears of a transmission, with a lateral shielding of the spur gears which protrudes only over a small section of the outer circumference of the spur gears.

EP 2 535 618 A1 discloses spur gears which are surrounded by housings, but which however do not protrude outside the housings.

WO 2012/028231 A1 discloses a gear transmission with an enveloping wall which surrounds at least one of two gear wheels operating with each other and partially or completely blocks off the surrounded interior space from the environment. The gear wheels do not protrude outside the enveloping wall.

JP 2011-163365 A1 discloses a gear transmission with an oil duct that partially molds to the shape of the gear wheels.

In the current state of the art, spur gear transmissions are described whose spur gears are tightly surrounded by an enveloping wall, as well as gear pumps with accordingly tightly surrounded gear wheels. With gear pumps, the purpose of the encapsulation is however totally different from that of other spur gear transmissions. Thus, an appropriate pressure chamber must be created in the mesh region of the gear wheels in order to bring the pump medium to the desired pump pressure. In order to achieve the desired pumping effort, the restricted and tight limit of the pressure chamber is necessary. In the use of such gear pumps, which circulate much slower than spur gear transmissions of this type, wetting of the gear wheels with the pump medium does not affect the efficiency. The gear wheels rather dip into the pump medium, normally an oil sump, in order to pump the medium as desired. In contrast, with spur gear transmissions of this type, wetting of the spur gears with fluid medium, in particular oil, plays a significant role. On the one hand, lubrication of the mesh region of the gears is necessary to avoid premature wear and tear. On the other hand, with increasing supply of fluid, in particular oil, the power loss increases due to the high speed of the spur gear transmissions. The demands upon spur gear transmissions of this type therefore differ fundamentally from the demands on gear pumps.

What is needed in the art is a spur gear transmission optimized for power losses, operates reliably with low wear and tear and can be produced cost effectively.

SUMMARY OF THE INVENTION

The present invention provides a spur gear transmission having at least two intermeshing spur gears, the teeth of which are in meshing engagement with one another, wherein the two spur gears in each case are rotatable via an axis of rotation. The spur gear transmission has an enveloping wall which surrounds the two spur gears in circumferential direction and in the direction of the axes of rotation, wherein the enveloping wall has an inner contour which is adapted to the outer diameter of the spur gears in such a manner that two annular gaps which merge into each other are formed between the enveloping wall and the spur gears, wherein one annular gap is arranged at least substantially concentrically with respect to each axis of rotation.

In one exemplary embodiment, the enveloping wall is formed by a two-part housing which is closed along a parting line and which has an upper part and a lower part, wherein the parting line extends partially or completely substantially within a plane in which the two axes of rotation of the spur gears extend, or in which one of the two axes of rotation extends.

Thus, the housing includes two parts, namely a first part which herein is referred to as the upper part and a second part which herein is referred to as the lower part and which are joined, particularly detachably with one another at the parting line, for example with screws.

The extension of the parting line in substantially one plane in which the two rotational axes extend provides that the parting line is located with a section or even completely in the plane from within the two axes of rotation extend or is at least close to said plane with the relevant section or completely, thus not exceeding a predetermined distance. The distance is for example smaller than an outside diameter of a drive shaft and/or an output shaft of the two spur gears. According to another exemplary embodiment, the distance is not greater than the radius of the drive shaft and/or the output shaft. The same applies also for an embodiment wherein the parting line is located in the plane of only one rotational axis of the spur gears.

The upper part may be designed as a single component. The upper part may enclose at least one half of the common outside circumference of the two spur gears as a single component. The common outside circumference of the two spur gears is the sum of the individual circumferences of both spur gears, minus the sections that are located immediately opposite one another. In other words, the half of the common outside circumference is formed in a vertical axial cross section through the two rotational axes by the section that is limited on one side by a plane in which both rotational axis extend.

In another exemplary embodiment, at least the upper section is designed as a welded construction. Alternatively, the upper part and the lower part can be designed as a welded construction.

At least the upper part or the upper part and the lower part may be manufactured from welded sheet steel.

According to another exemplary embodiment, the enveloping wall may be flexibly mounted in a vertical direction and/or in a horizontal direction.

The spur gear transmission may include a transmission housing that has an interior space that is filled with an air-lubrication mixture and the spur gears, together with the enveloping wall are located in the interior space.

The enveloping wall can be mounted in the transmission housing with individual locally limited mounted locations. These mounting locations may be provided as protrusions or support brackets on the outside of the enveloping wall. According to another exemplary embodiment, at least one upper mounting location is provided in the region of an upper end of the enveloping wall and moreover, at least two lower mounting locations are provided in the region of the parting line or below the parting line of the enveloping wall. According to yet another exemplary embodiment, additional, in particular four mounting locations, are provided in the region of the parting line of the enveloping wall.

The upper mounting location can be used for support, in particular for flexible support in a vertical direction. The mounting locations in the region of the parting line can be used for mounting, for flexible mounting in a vertical direction. The lower mounting locations can be used for mounting, for flexible mounting in a horizontal direction and/or in the vertical direction.

According to one embodiment, each mounting location of the enveloping wall is flexibly supported in the transmission housing. According to another embodiment, one or more mounting locations are designed as mounting locations which are flexibly supported to compensate for example, heat expansion. According to yet another embodiment, each mounting location is inflexibly secured within a common plane or at least substantially within a common plane in at least a first direction or within a first plane and is mounted in the transmission housing flexibly within a second direction, in particular a second plane that is progressing for example perpendicular to the first direction or the first plane. According to another exemplary embodiment, at least one additional mounting location is then fixed in a non-flexible manner in the transmission housing, outside this common plane in the second direction or second plane and supported flexibly parallel to the first direction or respectively planeparallel relative to the first plane.

The upper mounting location is for example, supported flexibly in a vertical direction and in a non-flexible manner in a horizontal direction in the transmission housing and the lower mounting locations are supported flexibly in the horizontal direction and in particular, in a non-flexible manner in the vertical direction in the transmission housing.

The flexible support of the mounting locations allows for compensation of heat expansion of the enveloping wall or respectively of different heat expansions between the enveloping wall and the transmission housing and provides that the gap between the spur gears and the enveloping wall can be minimal without the risk of touching.

A spur gear having at least one drive shaft or output shaft, may allow the shafts to be mounted in the transmission housing, in particular free from mounting in the enveloping wall.

The top part can include a continuously open or closable maintenance opening which enables direct access to the gear meshing region of the two spur gears. The access to the maintenance opening occurs for example via a so-called inspection cover in the transmission housing.

The transmission housing may be designed as a two- or multi-part unit and in particular includes a parting line in the same plane as the parting line of the enveloping wall. The transmission housing may include a lower housing half and an upper housing half which respectively can be designed as a single component or multi-part. The transmission housing may be manufactured of steel or a steel alloy.

The two spur gears may be located in horizontal direction of the spur gear transmission with their axes of rotation adjacent to one another, wherein the axes of rotation extends within a common horizontal plane. The plane extends parallel to the surface of an oil sump at the bottom of the spur gear transmission. The two spur gears may be arranged at a distance to an oil sump at the bottom of the spur gear transmission.

According another exemplary embodiment, at least one sealing element is connected to the enveloping wall, which element seals at least one annular gap at least partially, and the at least one sealing element is produced from a softer material than the upper part or than the upper part and the lower part of the enveloping wall.

The lower part may include an opening that exposes a section of the circumference of at least one spur gear or of both spur gears, which opening is directed downward, originating from the rotational axes of the spur gears.

For example, such an opening in circumferential direction of the spur gears can be sealed at least partially on both sides with a respective sealing element relative to the at least one spur gear or relative to both spur gears.

The sealing elements may be produced from aluminum. The sealing elements may be designed to adjust in a radial direction. Therefore, for example, based on mounting in a slot and fastening with a suitable screw, they can be moved in the direction of the tooth profile in such a manner that the remaining annular gap can be adjusted very precisely. Manufacturing based tolerances can be reacted to. In spite of a comparatively broad tolerance, the desired dimension of the annular gap can be adjusted precisely.

At least one temperature measuring point can be provided on the enveloping wall. According to one embodiment, several temperature measuring points are provided on the enveloping wall.

The enveloping wall may include a lubricating oil supply where a lubricating oil stream can be fed or sprayed into the teeth of the spur gears. For this purpose, an opening in the enveloping wall be provided. The opening may be provided in a sidewall of the enveloping wall. The lubricating oil stream can be drained via the previously discussed downward directed opening and/or via an additional opening, e.g. a sidewall of the enveloping wall. Between the outside circumference of the enveloping wall and the at least upper housing half of the transmission housing several sheet metal elements may extend in a radial direction onto the transmission housing forming at least three axially adjacent channel sections. This ensures that, viewed in axial direction, the cooling medium can flow in the central channel section or sections. Adjacent regions remain through which air flows to receive and drain lubricating oil.

In one exemplary embodiment, radial openings may be arranged in the enveloping wall, e.g. the region of the axially external channel sections, so that possible lubricating oil mist can easily and efficiently be removed from this region.

The enveloping wall may be liquid-cooled, e.g. oil-cooled. For this purpose, a cooling medium stream can be guided over the enveloping wall and/or through the enveloping wall. The cooling medium stream can be adjusted independently from the lubricating oil stream, e.g. variable or controllable in its volume flow. An individual pump may be provided respectively for the lubricating oil stream and for the cooling medium stream. Other measures for independent adjustment of the two streams can of course also be provided.

An axial distance of the spur gears from the side walls of the enveloping wall can be considerably greater than the radial distance between the gear teeth and the enveloping wall. The axial distance may be greater than 10 mm and the radial distance may be 2 mm maximum.

Radial and/or axial openings can be provided in the enveloping wall or respectively in its side walls in order to permit oil drainage of the lubricating oil stream and in particular discharge of air and lubricating oil mist. The opening in the side walls, in other words the openings in the region of the annular gap permit evacuation of undesirable lubricating oil mists and venting of the interior space in which the spur gears move. In addition, axial openings of this type in the side walls of the enveloping wall may allow a view onto the teeth of the spur gears during assembly, providing adjustability due to the visual contact onto the elements that are to be positioned relative to one another.

The liquid cooling of the enveloping wall can be respectively provided in the upper part and/or respectively in the lower part.

During assembly of the spur gear transmission, the upper part can be screwed onto the lower part i.e. before an upper part of the transmission housing is mounted onto the lower part of the transmission housing.

In one embodiment, the spur gear transmission is designed as a speed-torque converter. The spur gears may be positioned free from submersion into a liquid supply, e.g. an oil sump.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
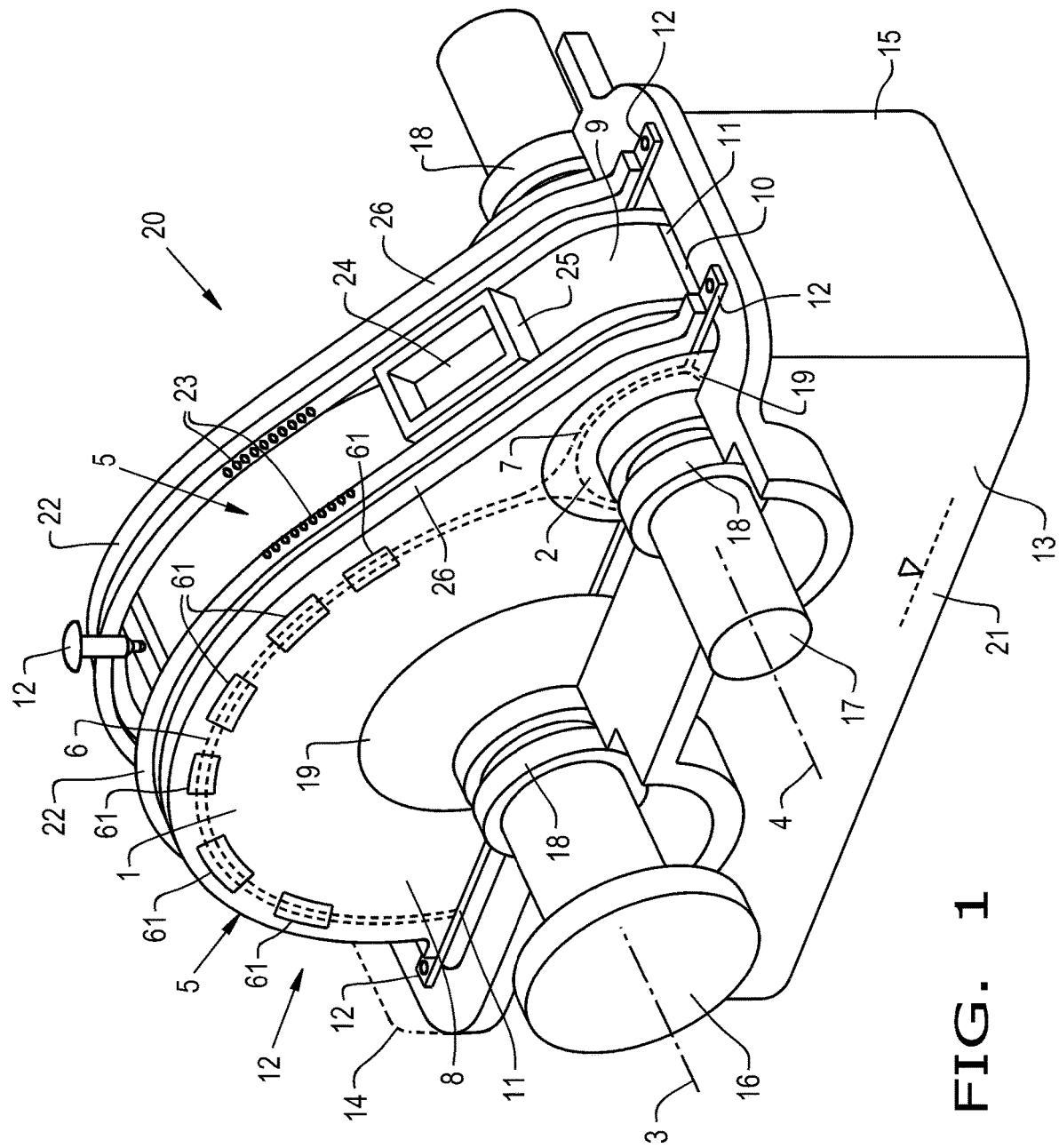
FIG. 1 shows a schematic depiction of an embodiment of a spur gear transmission formed according to the invention.

Referring now to the drawings, and more particularly to FIG. 1, there is shown an exemplary embodiment of a spur gear transmission according to the invention. The two spur gears are identified with 1 and 2 and their teeth intermesh with each other so that by driving one of the two spur gears 1, 2 via the appropriate respective rotational axis 3 or 4 the respective other spur gear 1, 2 is driven in the same way via its respective rotational axis 3 or 4 by way of the intermeshing of the gear teeth.

The two spur gears 1, 2 are tightly surrounded by an enveloping wall 5 along the greater part of their outside circumference, wherein the inside contour of enveloping wall 5 is adapted to the outside diameter of the two spur gears 1, 2 in such a manner that that two annular gaps 6, 7 which merge into each other are formed between enveloping wall 5 and spur gears 1, 2. FIG. 1 illustrates these annular gaps schematically with dashed lines, since they are covered by side wall 8 of enveloping wall 5. The axial openings 61 are shown in FIG. 1 in the region of recognizable side wall 8 of enveloping wall 5. Through these radial axial openings 61, removal particularly of lubricating oil mists is possible from the region of annular gaps 6, 7. In addition, these axial openings 61 allow a visual contact onto the teeth of the spur gears and thus facilitate easy adjustability.

Enveloping wall 5 has an upper part 9 and a lower part 10 which, in this example are respectively manufactured as a welded construction from steel sheet and which form a closed two-part housing along parting line 11. Parting line 11 can be seen more easily in FIG. 3 to which we will refer later.

Enveloping wall 5 is supported via a number of mounting locations 12 in a transmission housing 13 of which upper housing half 14 is indicated only schematically in FIG. 1 and of which lower housing half 16 is shown at least substantially completely.

The two spur gears 1 and 2 each includes a shaft 16, 17 wherein one of which shaft drives the respective spur gear 1, 2 and wherein the other one, due to intermeshing of the two spur gears 1, 2, is driven accordingly as a drive shaft. The two shafts 16, 17 are supported on bearings 18 in transmission housing 13.

In the exemplary embodiment shown in FIG. 1, shielding plates 19 are provided laterally adjacent to bearings 18 in an axial direction of rotary axes 3, 4 which are intended to prevent a transfer of the bearing oil of bearings 18 onto the rotating parts of spur gears 1, 2. Such shielding plates 18 are useful when enveloping wall 5 is not completely or only almost completely closed laterally, in other words if relevant side walls 8 are located at a greater distance to shafts 16, 17. Shielding plates 19 can be eliminated, if sidewalls 8 largely enclose enveloping wall 5.

Enveloping wall 5 is equipped with a cooling device 20 by which it can be cooled independently of a lubricating oil supply for spur gears 1, 2. The cooling medium can be oil, from the same oil supply or oil sump from which also the lubricating oil supply occurs. As shown schematically in FIG. 1, such an oil sump can be provided at the bottom in transmission housing 13 and can be located at a distance to spur gears 1, 2. In FIG. 1, oil sump 21 is identified with 21 and is only schematically indicated.

Cooling device 20 includes two cooling tubes 22 extending along the outside of enveloping wall 5, the cooling tubes including outlet openings 24 through which the cooling medium can be sprayed onto the outside of cooling wall 5. The cooling medium can then drain downward along cooling wall 5 into the oil sump 21. Upper part 9 and lower part 10 may be cooled in this manner. In addition, or alternatively it is also conceivable to provide cooling ducts inside enveloping wall 5.

In the exemplary embodiment shown in FIG. 1, a maintenance opening 24 is provided in enveloping wall 5 which includes a side wall 25 in order to prevent cooling medium flowing through maintenance opening 24 onto spur gears 1, 2. However, the maintenance opening is not required.

Enveloping wall 5 in FIG. 1 includes two bars 26 in order to improve the stability of enveloping wall 5. However, depending on the wall strength of enveloping wall 5, the arrangement of the bars may be foregone.

The parting line of transmission housing 13 also proceeds substantially in the same plane as parting line 11 between upper part 9 and lower part 10 of enveloping wall 5. In this case, a different arrangement could be selected in regard to mounting of shafts 16, 17 or respectively bearings 18.

Figure 2:
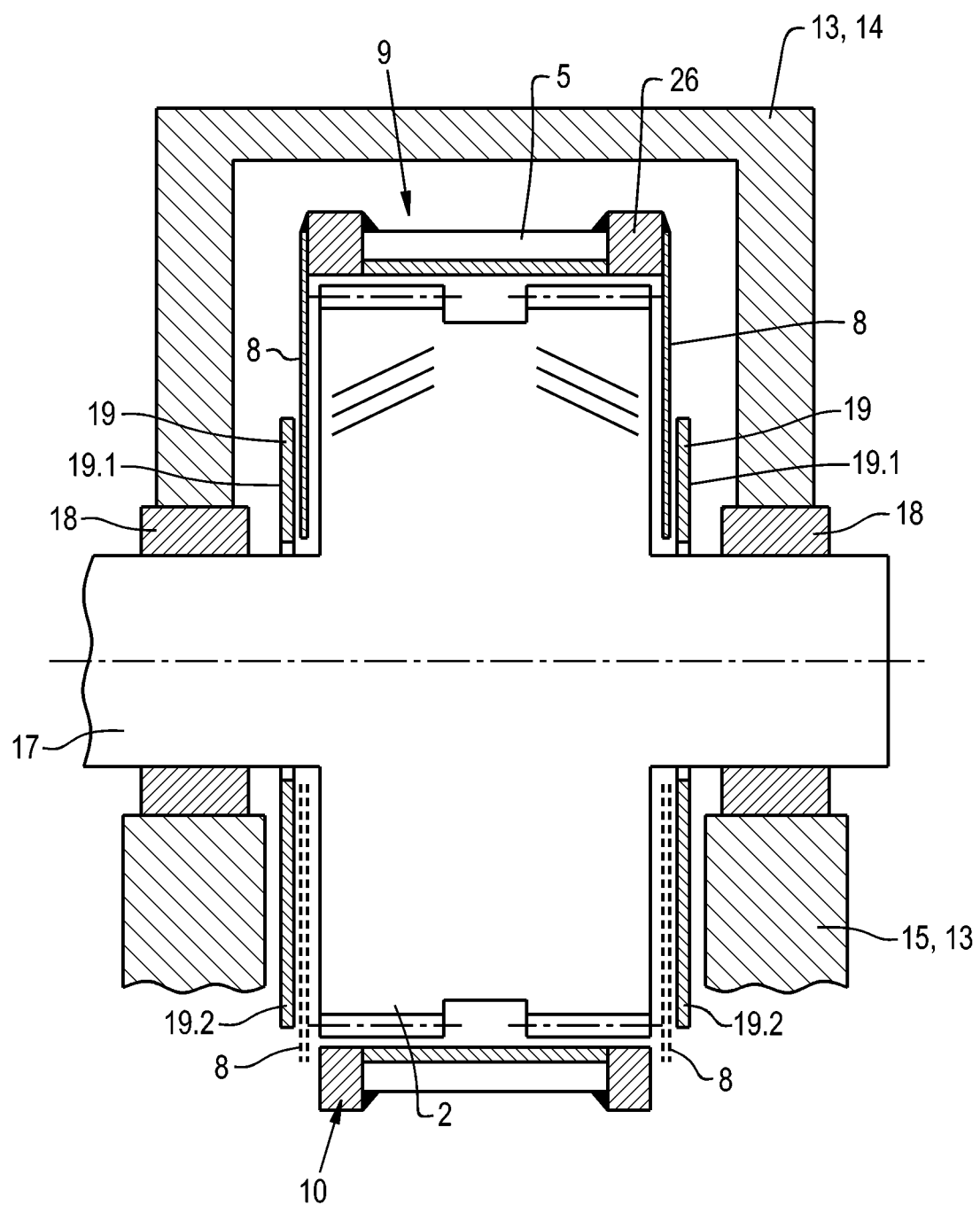
FIG. 2 shows a schematic, front cross section view through a rotational axis of a spur gear of another embodiment of a spur gear transmission formed according to the invention.
Figure 3:
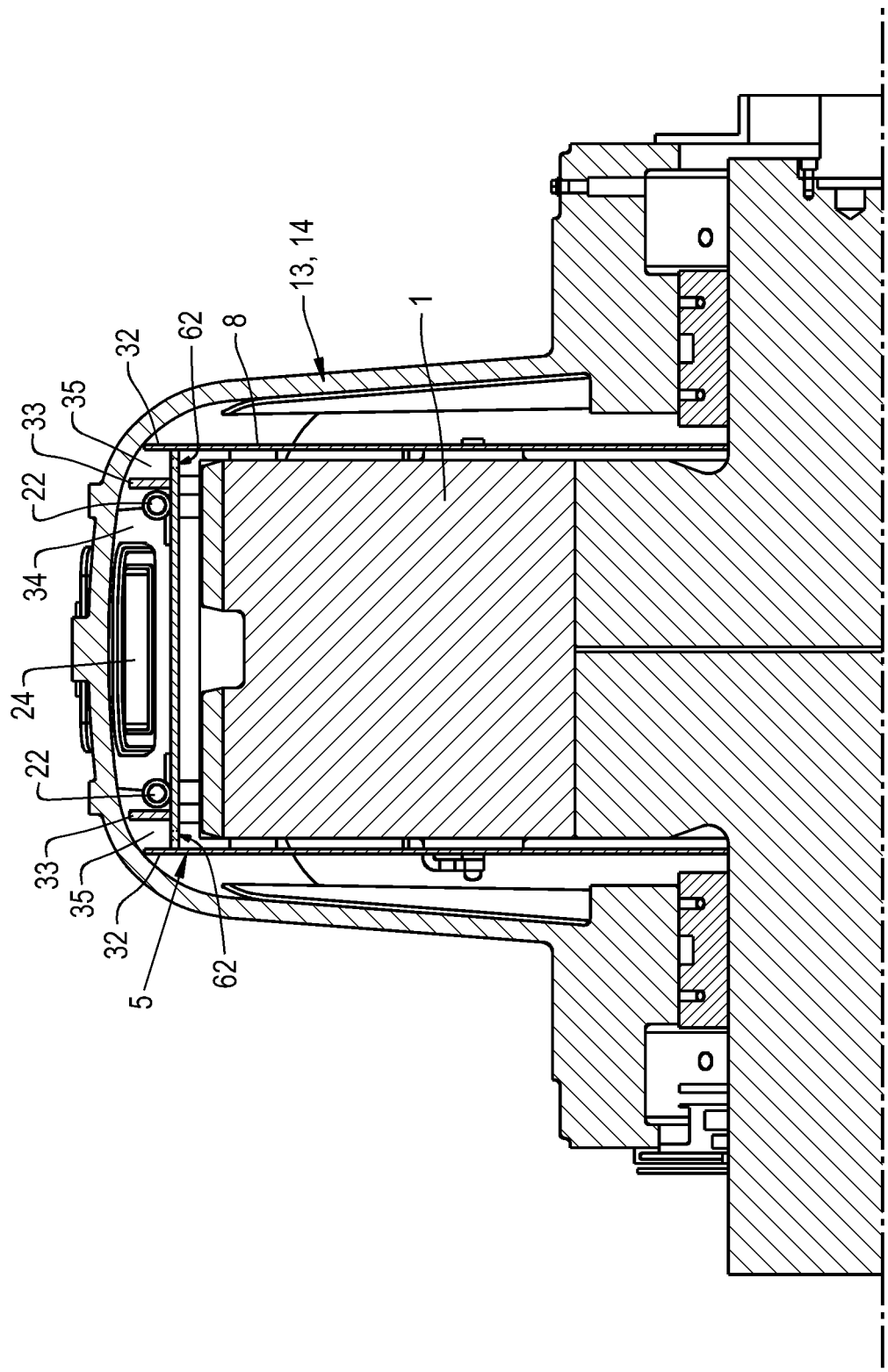
FIG. 3 shows a schematic, front cross section view through a rotational axis of a spur gear of another embodiment of a spur gear transmission wherein only the upper half of the spur gear transmission is shown.
Figure 4:
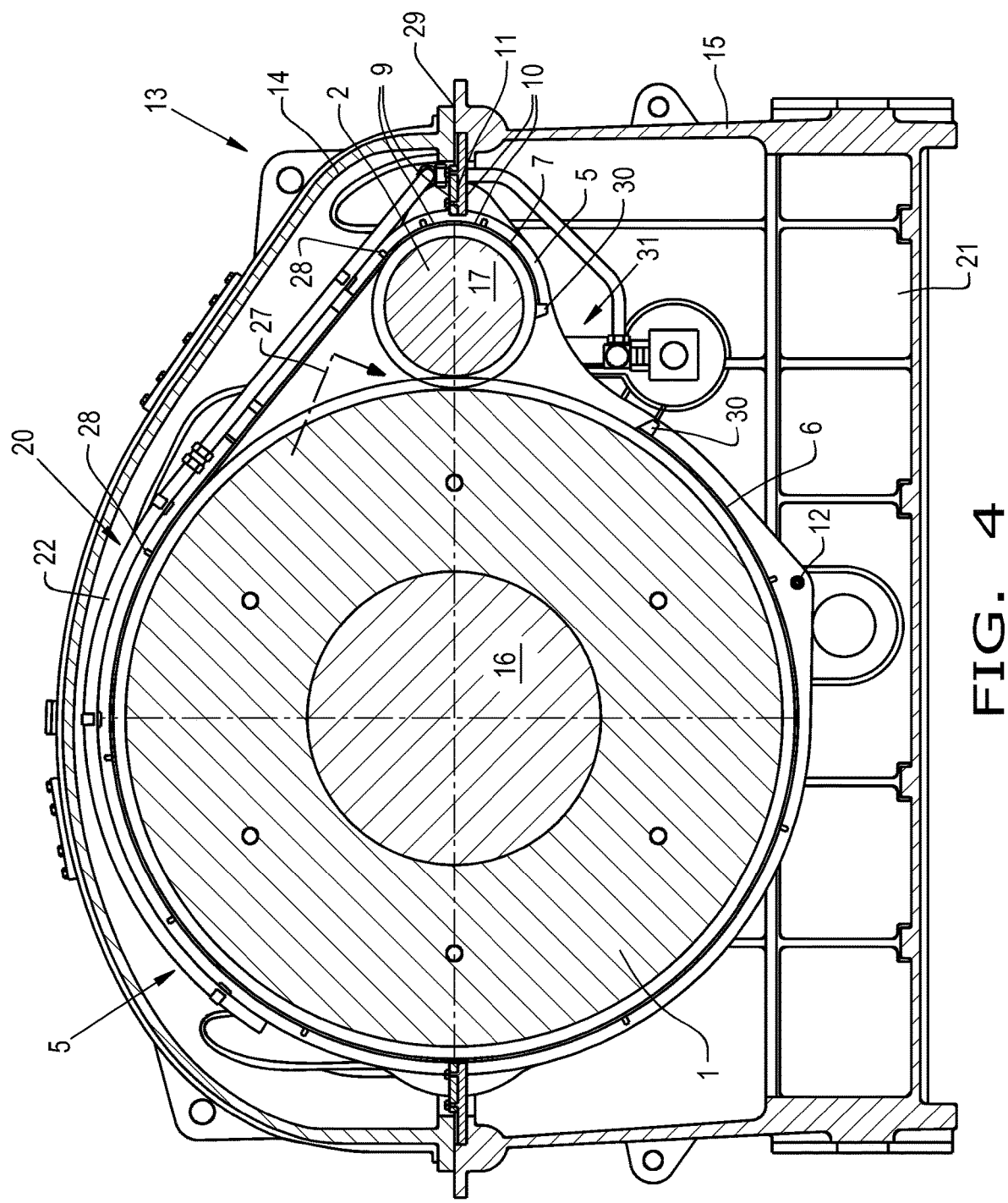
FIG. 4 shows a schematic, side another cross section view in a radial direction through the rotational axes of another embodiment of a spur gear transmission formed according to the invention.

The relevant components in FIGS. 2, 3 and 4 are identified with the same references as in FIG. 1.

It can be seen in FIG. 2 that the spur gears, illustrated here by spur gear 2, are for example designed as double toothed spur gears, e.g. double helical teeth. It can also be seen that enveloping wall 5 is a welded construction, in this case again with bars 26 which however can be eliminated where appropriate. Shielding plates 19 shown in FIG. 2 are a two-part component having a shielding plate upper part 19.1 and a shielding plate lower part 19.2. This can also be eliminated, especially if, lower part 10 of enveloping wall 5 also has side walls 8. Side walls 8 are designed integrally with enveloping wall 5.

The distances of spur gear 2 to enveloping wall 5 are not shown to scale in FIG. 2. Rather, the distance in radial direction as a rule is substantially less than the distance in axial direction. The distance between enveloping wall 5 and the respective spur gear may be many times greater than the radial distance.

Another exemplary embodiment is shown in FIG. 3. FIG. 3 also shows schematically a lubricating oil supply 27 which in the region of the teeth can supply spur gears 1, 2 with oil independently of cooling device 20. In addition, possible temperature measuring points 28 are shown which can be provided on enveloping wall 5.

Parting line 29 of transmission housing 13 is somewhat offset relative to parting line 11 of enveloping wall 5, it is however parallel thereto.

Side walls 8 of enveloping wall 5 are herein joined together with the circumference-side part of enveloping wall 15 to form a welded component. Due to protruding side walls 8 or additional sheet metal elements which are identified with 32 in FIG. 3, quasi sealing occurs of the region located in circumferential direction radially externally of spur gear 1 and enveloping wall 5 relative to the region located adjacent to side walls 8 inside transmission housing 13. In this context, "quasi" means that no actual sealing occurs since a certain gap remains, not least so that because of assembly reasons the tolerances are not unnecessarily being increased.

Additional sheet metal elements identified with 33 in FIG. 3 and viewed in the axial direction, are located inside and are positioned between first sheet metal elements 32 and cooling tubes 22. Several individual channel segments are thereby formed. One large central channel section 34 includes the two cooling tubes 22 and a region of maintenance openings 24. In addition, two external channel sections 35 are located adjacent thereto in the axial direction which are connected via radial openings 62 with the interior space below enveloping wall 5. Escaping oil mist and outflowing air can be captured via the two external channel sections 35 and can be diverted independently of the cooling of enveloping wall 5.

In addition, axial openings 61 shown in FIG. 1 and previously discussed can also be present. They are not clearly visible in the drawing and are thus not identified.

Sealing elements 30, shown in FIG. 4, seal the annular gaps 6, 7 at the circumferential ends of enveloping wall 5. These sealing elements 30 may be produced from a softer material than enveloping wall 5, e.g. from aluminum or an aluminum alloy. Sealing elements 30 may be adjustable in a radial direction so that the gap width of annular gaps 6, 7 can be adjusted in the desired precise manner based on an adjustment of sealing elements 30.

Between the two sealing elements 30 an opening 31 in enveloping wall 5 is provided through which lubricating oil can escape from enveloping wall 5.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

COMPONENT IDENTIFICATION LISTING

1 Spur gear
2 Spur gear
3 Rotational axis
4 Rotational axis
5 Enveloping wall
6 Annular gap
7 Annular gap
8 Side wall
9 Upper part
10 Lower part
11 Parting line
12 Mounting location
13 Transmission housing
14 Upper housing half
15 Lower housing half
16 Shaft
17 Shaft
18 Bearing
19 Shielding plate
19.1 Shielding plate upper part
19.2 Shielding plate lower part
20 Cooling device
21 Oil sump
22 Cooling tube
23 Outlet opening
24 Maintenance opening
25 Maintenance opening side wall
26 Bar
27 Lubricating oil supply
28 Temperature measuring point
29 Parting line
30 Sealing element
31 Opening
32 Sheet metal elements
33 Additional sheet metal elements
34 Central channel section
35 External channel section
61 Axial openings
62 Radial openings

What is claimed is:

1. A spur gear transmission, comprising:
   at least two intermeshing spur gears having a plurality of teeth, the plurality of teeth of each in a meshing engagement with one another, and rotatable via a respective axis of rotation;
   an enveloping wall surrounding the at least two intermeshing spur gears in a circumferential direction and in a direction of the respective axis of rotation, the enveloping wall including:
      an inner contour adapted to an outer diameter of the at least two intermeshing spur gears thereby forming two annular gaps between the enveloping wall and the at least two intermeshing spur gears merging into each other, at least one of the two annular gaps is substantially concentric to the respective axis of rotation;
      an upper part including a plurality of axial openings in a region of the two annular gaps; and
      a lower part being joined to the upper part along a parting line, the parting line extends at least partially within a plane in which at least one of the respective axis of rotation extends, the lower part including an opening that exposes a section of the circumference of at least one of the at least two intermeshing spur gears, the opening being directed downward relative to the respective axis of rotation; and
   a lubricating oil supply configured for providing a lubricating oil stream onto the plurality of teeth of the at least two intermeshing spur gears,
   wherein at least one of the upper part and the lower part being a welded construction, the upper part and the lower part defining a two-part housing which is closed along the parting line, at least one of the upper part and the lower part includes two side walls arranged opposite one another and enclosing at least part of the at least two intermeshing spur gears in an axial direction in between the side walls.

2. The spur gear transmission according to claim 1, wherein the upper part and the lower part are detachably joined along the parting line.

3. The spur gear transmission according to claim 1, wherein at least one of the upper part and the lower part are a welded sheet steel.

4. The spur gear transmission according to claim 1, wherein the upper part encloses at least one half of a common outside circumference of the at least two intermeshing spur gears as a single component.

5. The spur gear transmission according to claim 1, wherein the spur gear transmission includes a transmission housing having an interior space filled with an air-lubrication mixture and the at least two intermeshing spur gears and the enveloping wall are located in the interior space, wherein the at least two intermeshing spur gears are arranged in the interior space above an oil sump at a distance to the oil sump.

6. The spur gear transmission according to claim 5, wherein the transmission housing is manufactured from steel or a steel alloy.

7. The spur gear transmission according to claim 5, wherein between the outside circumference of the enveloping wall and an upper housing half of the transmission housing a plurality of sheet metal elements extend in a radial direction onto the transmission housing forming at least three axially adjacent channel sections.

8. The spur gear transmission according to claim 7, wherein the enveloping wall includes a plurality of radial openings in a region of the at least three axially adjacent channel sections.

9. The spur gear transmission according to claim 1, wherein at least one sealing element is connected to the enveloping wall, the at least one sealing element at least partially seals at least one annular gap, the at least one sealing element being produced from a softer material than at least one of the upper part and the lower part.

10. The spur gear transmission according to claim 9, wherein the at least one sealing element is produced from aluminum.

11. The spur gear transmission according to claim 9, wherein the at least one sealing element is configured to adjust in a radial direction.

12. The spur gear transmission according to claim 1, wherein the opening in the circumferential direction of the at least two intermeshing spur gears is sealed on both sides with the at least one sealing element on at least one of the at least two intermeshing spur gears.

13. The spur gear transmission according to claim 1, wherein at least one temperature measuring point is provided on the enveloping wall.

14. The spur gear transmission according to claim 1, wherein the enveloping wall is liquid-cooled.

15. The spur gear transmission according to claim 14, wherein liquid cooling of the enveloping wall is accomplished with a cooling medium stream that is at least one of being guided over the enveloping wall and through the enveloping wall, the cooling medium stream being independently adjustable from the lubricating oil stream.

16. The spur gear transmission according to claim 1, wherein the plurality of axial openings are configured for venting the two-part housing.

\* \* \* \* \*

UNITED STATES PATENT AND TRADEMARK OFFICE
CERTIFICATE OF CORRECTION

PATENT NO. : 10,816,081 B2
APPLICATION NO. : 16/205569
DATED : October 27, 2020
INVENTOR(S) : Kämmerer et al.

It is certified that error appears in the above-identified patent and that said Letters Patent is hereby corrected as shown below:

In the Specification

Column 6
At Line 49, in the Fig. 4 description, between side and cross, please delete "another".

Signed and Sealed this
Eleventh Day of October, 2022

Katherine Kelly Vidal
*Director of the United States Patent and Trademark Office*